United States Patent
Harada et al.

(10) Patent No.: US 9,416,284 B2
(45) Date of Patent: Aug. 16, 2016

(54) COPOLYMER, AQUEOUS INK, AND INK CARTRIDGE

(71) Applicants: Shigeyuki Harada, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP)

(72) Inventors: Shigeyuki Harada, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/840,570

(22) Filed: Aug. 31, 2015

(65) Prior Publication Data
US 2016/0075892 A1 Mar. 17, 2016

(30) Foreign Application Priority Data
Sep. 16, 2014 (JP) .................... 2014-187382

(51) Int. Cl.
*C09D 11/107* (2014.01)
*C08F 220/06* (2006.01)
*C08F 222/20* (2006.01)
*C09D 11/30* (2014.01)

(52) U.S. Cl.
CPC ............ *C09D 11/107* (2013.01); *C08F 220/06* (2013.01); *C08F 222/20* (2013.01); *C09D 11/30* (2013.01)

(58) Field of Classification Search
CPC .... C09D 11/107; C09D 11/30; C08F 220/06; C08F 222/20
See application file for complete search history.

(56) References Cited

U.S. PATENT DOCUMENTS

| | | | | |
|---|---|---|---|---|
| 6,652,634 B1* | 11/2003 | Akers, Jr. | .............. | C09D 11/326 106/31.13 |
| 2007/0043144 A1* | 2/2007 | House | ................. | C09D 11/322 523/160 |
| 2009/0018245 A1* | 1/2009 | Idemura | ............... | C09D 11/326 524/357 |
| 2014/0072779 A1 | 3/2014 | Matsuyama et al. | | |
| 2014/0120331 A1 | 5/2014 | Koizuka et al. | | |
| 2014/0141209 A1 | 5/2014 | Koizuka et al. | | |
| 2014/0198160 A1 | 7/2014 | Harada et al. | | |
| 2014/0199530 A1 | 7/2014 | Katoh et al. | | |
| 2014/0242352 A1 | 8/2014 | Naruse et al. | | |
| 2015/0056425 A1 | 2/2015 | Nagai et al. | | |
| 2015/0064418 A1 | 3/2015 | Matsuyama et al. | | |
| 2015/0064425 A1 | 3/2015 | Matsuyama et al. | | |
| 2015/0109382 A1 | 4/2015 | Naruse et al. | | |
| 2015/0116421 A1 | 4/2015 | Nonogaki et al. | | |
| 2015/0125672 A1 | 5/2015 | Katoh et al. | | |
| 2016/0017075 A1* | 1/2016 | Harada | ................ | C09D 11/107 347/86 |

FOREIGN PATENT DOCUMENTS

| | | |
|---|---|---|
| JP | 3-160068 | 7/1991 |
| JP | 2000-169769 | 6/2000 |
| JP | 2005-298802 | 10/2005 |
| JP | 2006-188624 | 7/2006 |
| JP | 2008-536963 | 9/2008 |
| JP | 2011-105866 | 6/2011 |
| JP | 2012-051357 | 3/2012 |
| JP | 2012-052027 | 3/2012 |
| JP | 2015-117354 | 6/2015 |
| WO | WO2006/099551 A2 | 9/2006 |
| WO | WO2007/053563 A2 | 5/2007 |

OTHER PUBLICATIONS

U.S. Appl. No. 14/625,051, filed Feb. 18, 2015.
U.S. Appl. No. 14/634,054, filed Feb. 27, 2015.
U.S. Appl. No. 14/800,064, filed Jul. 15, 2015 Inventor: Harada, et al.
U.S. Appl. No. 14/793,981, filed Jul. 8, 2015 Inventor: Harada, et al.

* cited by examiner

*Primary Examiner* — Alexander Kollias
(74) *Attorney, Agent, or Firm* — Oblon, McClelland, Maier & Neustadt, L.L.P.

(57) ABSTRACT

A copolymer includes structural units having the following formulae (1) and (2):

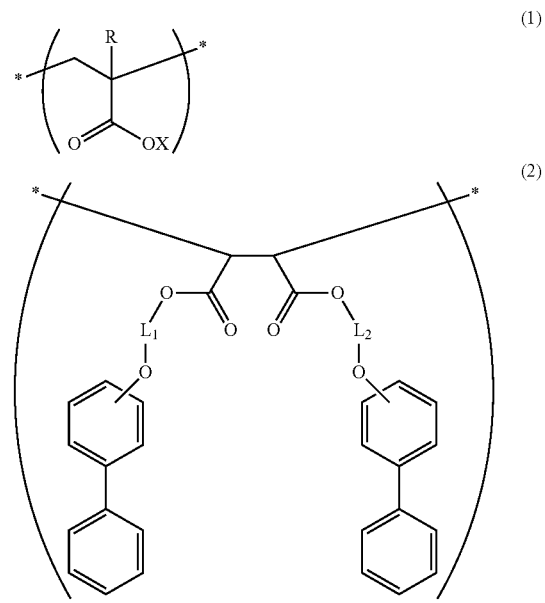

wherein R represents a hydrogen atom or a methyl group; X represents a hydrogen atom or a cationic ion; and each of L1 and L2 independently represents an alkylene group having 2 to 18 carbon atoms.

7 Claims, 1 Drawing Sheet

COPOLYMER, AQUEOUS INK, AND INK CARTRIDGE

CROSS-REFERENCE TO RELATED APPLICATIONS

This patent application is based on and claims priority pursuant to 35 U.S.C. §119 to Japanese Patent Application No. 2014-187382, filed on Sep. 16, 2014, in the Japan Patent Office, the entire disclosure of which is hereby incorporated by reference herein.

BACKGROUND

1. Technical Field

The present invention relates to a new copolymer effectively used as a binder resin of an aqueous ink and a pigment-dispersed resin, an aqueous ink including the copolymer, and an ink cartridge.

2. Description of the Related Art

Inkjet recording methods are advantageous in comparison with other recording methods in that since the process is simple, full colorization is easy and high definition images can be obtained by a device having a simple configuration. For this reason, the inkjet recording is widely diffusing from home use to office use, commercial printing, and industrial printing. In such an inkjet recording, aqueous ink compositions using hydrosoluble dye as coloring materials are mainly used. However, its water resistance and light resistance are inferior so that the development of a pigment ink using a water insoluble pigment is in advance in place of the hydrosoluble dye.

For inkjet ink printing for office use, recording media, typically plain paper, are used and high image density is demanded. In general, when images are printed on plain paper using a pigment ink, the pigment ink does not stay on the surface of the paper but permeates into the paper, so that the pigment density on the surface decreases and consequently the image density lowers. As the pigment concentration in the ink increases, the image density increases. However, the ink becomes viscous, thereby degrading the discharging stability of the ink.

Moreover, water contained in the pigment ink swells the surface of plain paper immediately after the ink droplets land on the paper. As a result, the extension percentage differs between the top surface and the bottom surface of the paper, thereby causing the paper to curl. This kind of phenomenon does not create a problem at low speed printing since curling is canceled as drying proceeds. However, as the printing speed increases, recording media are transferred before curling is canceled after printing, which naturally leads to occurrence of paper jam. To prevent paper jam, it is suitable to add a permeating agent to a pigment ink to promote water to permeate into paper. However, ink becomes hydrophobic by the agent, which makes it difficult to secure storage stability of the ink. Also, the pigment ink more easily permeates into a recording medium, thereby furthermore decreasing the image density.

SUMMARY

Accordingly, one object of the present invention is to provide a new copolymer effectively used as a binder resin of an aqueous ink and a pigment-dispersed resin.

Another object of the present invention is to provide an aqueous ink including the copolymer.

A further object of the present invention is to provide an ink cartridge containing the aqueous ink.

These objects and other objects of the present invention, either individually or collectively, have been satisfied by the discovery of a copolymer, including structural units having the following formulae (1) and (2).

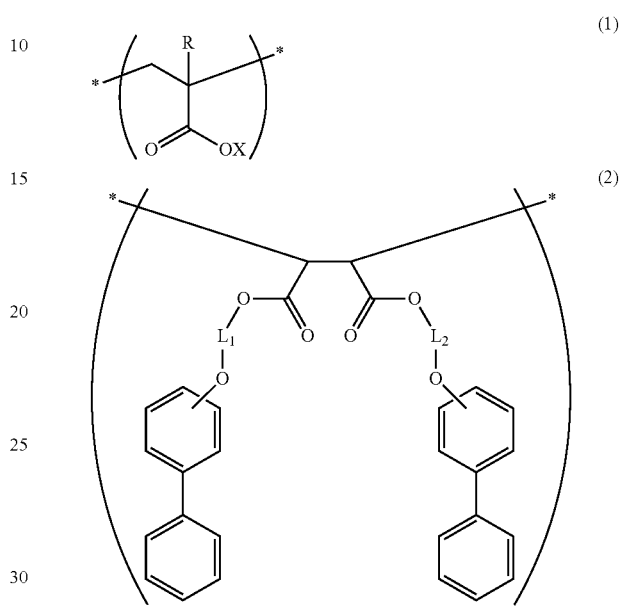

wherein R represents a hydrogen atom or a methyl group; X represents a hydrogen atom or a cationic ion; and each of L1 and L2 independently represents an alkylene group having 2 to 18 carbon atoms.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
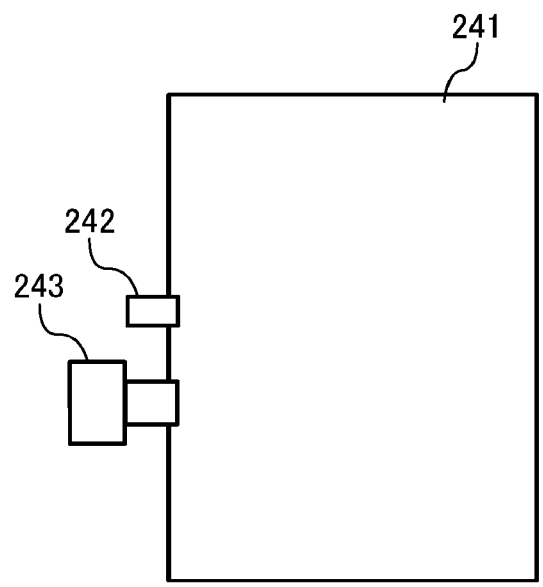
FIG. 1 is a schematic view illustrating an embodiment of the ink cartridge of the present invention.

The present invention provides a new copolymer effectively used as a binder resin of an aqueous ink and a pigment-dispersed resin.

A copolymer for use in the aqueous ink of the present invention has structural units having the formulae (1) and (2). In the formula (1), R represents a hydrogen atom or a methyl group, X represents a hydrogen atom or a cation. When X is a cation, the oxygen adjacent to the cation is existent as Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, tri ethyl methyl ammonium ion, tributyl methyl ammonium ion, trioctyl methyl ammonium ion, 2-hydroxyethyl trimethyl ammonium ion, tris(2-hydroxyethyl)methyl ammonium ion, propyltrimethyl ammonium ion, hexyl trimethyl ammonium ion, octyl trimethyl ammonium ion, nonyl trimethyl ammonium ion, decyltrimethyl ammonium ion, dodecyl trimethyl ammonium ion, tetra decyltrimethyl ammonium ion, hexadecyl trimethyl ammonium ion, octadecyl trimethyl ammonium ion, didodecyl dimethyl ammonium ion, ditetradecyl dimethyl ammonium ion, dihexadecyl dimethyl ammonium ion, dioctadecyl dimethyl ammonium ion, ethyl hexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethyl ethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

In the formula (2), each of L1 and L2 represents an alkylene group having 2 to 18 carbon atoms, and preferably an alkylene group having 2 to 12 carbon atoms. L1 and L2 may be the same or different from each other, but preferably the same to simply and surely obtain (synthesize) a copolymer. In addition, they can be different from each other when the resultant copolymer loses structural uniformity, e.g., when the copolymer loses crystallinity and increase amorphousness.

However, when L1 and L2 are different from each other, troublesome operations are needed, i.e., first, monomers are very cautiously obtained at two steps, an unreacted carboxylic acid and a hydroxy compound are removed after the first reaction on the way (this is comparatively simple), and diester produced a little regardless of the cautiousness is separated and removed from the resultant monoester before the second reaction.

Since a naphthyl group present at the end through L1 or L2 has good pigment absorptivity with a pigment which is a coloring material in the aqueous ink because of $\pi$-$\pi$ stacking, a pigment quickly aggregates when contacting it on a medium to be printed to prevent beading.

As seen from the formula (1) and particularly from the formula (2), a terminal naphthyl group hanging down through L in the formula (2) and a side chain carboxyl group in the formula (1) may be a pendant hanging from the main chain. However, as a matter of course, they may partially be included in a structure besides the main chain. For example, it is well known that it is difficult to completely exclude a secondary radical polymerization reaction producing a branch structure.

When the copolymer of the present invention is used when preparing a pigment dispersion including water and a pigment dispersed in the water, the copolymer including a naphthyl group at the end of the side chain thereof is easily adsorbed to the surface of a pigment, and a stable dispersion having high dispersibility is obtained. In order to prevent beading, in terms of pigment aggregation speed on the surface of a medium to be printed, copolymer of the present invention is preferably used as an additive and can be used as a dispersant dispersing a pigment as well.

A molar ratio of the structural unit having the formula (1) to the structural unit having the formula (2) constituting the copolymer of the present invention is from 1:1 to 20:1, preferably from 1:1 to 10:1, and more preferably from 1:1 to 5:1.

The copolymer of the present invention preferably has a number-average molecular weight and a weight-average molecular weight of from 500 to 10,000 and 1,500 to 30,000, respectively in polystyrene conversion.

The copolymer of the present invention may have a structural unit formed of other polymerizable monomers in addition to the structure units having the formulae (1) and (2).

There is no specific limit to such other polymerizable monomers. These can be selected to particular applications. Examples thereof are polymerizable hydrophobic monomers, polymerizable hydrophilic monomers, and polymerizable surfactants.

Specific examples of the polymerizable hydrophobic monomers include, but are not limited to, unsaturated ethylene monomers having aromatic ring such as styrene, $\alpha$-methyl styrene, 4-t-butyl styrene, and 4-chloromethyl styrene; (meth)acrylic acid alkyl such as methyl (meth)acrylate, ethyl (meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl (meth)acrylate (C16), heptadecyl(meth)acrylate (C17), nonadecyl(meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination.

Specific examples of the polymerizable hydrophilic monomers include, but are not limited to, anionic unsaturated ethylene monomers such as maleic acid or salts thereof, monomethyl maleate, itaconic acid, monomethyl itaconate, fumaric acid, 4-styrene sulfonic acid, 2-acrylic amide-2-methyl propane sulfonic acid, or anionic unsaturated ethylene monomers having phosphoric acid, phosphonic acid, alendronic acid, or etidronic acid; and nonionic unsaturated ethylene monomers such as 2-hydroxyethyl (meth)acrylic acid, diethylene glycol mono(meth)acrylate, triethylene glycol mono (meth)acrylate, tetraethylene glycol mono(meth)acrylate, polyethylene glycol mono(meth)acrylate, (meth)acrylamide, N-methylol(meth)acrylamide, N-vinyl formamide, N-vinyl acetoamide, N-vinyl pyrrolidone, acrylamide, N,N-dimethyl acrylamide, N-t-butyl acrylamide, N-octyl acrylamide, and N-t-octyl acrylamide.

The polymerizable hydrophobic and the polymerizable hydrophilic monomers are used alone or in combination in an amount of from 5% to 10% by weight based on total weight of the monomers forming the structural units having the formulae (1) and (2).

The polymerizable surfactant is an anionic or nonionic surfactant having at least one radically-polymerizable unsaturated double bond group in its molecule.

Specific examples of the anionic surfactant include, but are not limited to, a hydrocarbon compound having a sulfate salt group such as ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacrylic group [($-CO-C(CH_3)=CH_2$], and an aromatic hydrocarbon compound having a sulfate group such as ammonium sulfate group ($-SO_3-NH_4^+$) and a 1-propenyl group ($-CH=CH_2CH_3$). Specific examples thereof include, but are not limited to, ELEMINOL JS-20 and RS-300 (both manufactured by Sanyo Chemical Industries, Ltd. and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_n-H$]. Specific examples thereof include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

The polymerizable surfactants are used alone or in combination in an amount of from 0.1% to 10% by weight based on total weight of the monomers forming the structural units having the formulae (1) and (2).

As the following reaction formulae (1) to (3) show, first, naphthol (A-1) and a brominated alcohol compound are reacted each other under the presence of potassium carbonate to obtain an ether compound (A-2). Next, maleic acid anhydride (A-3) and the ether compound (A-2) are reacted each other to obtain a maleic acid diester monomer (A4). Then, the maleic acid diester monomer (A4) is copolymerized with (meth)acrylic acid monomer (A-5) under the presence of a radical polymerization initiator to obtain the copolymer of the present invention (A-6).

Reaction Formula (1)

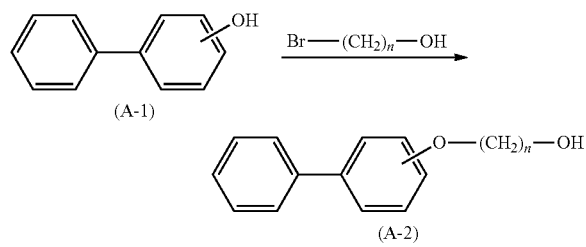

Reaction Formula (2)

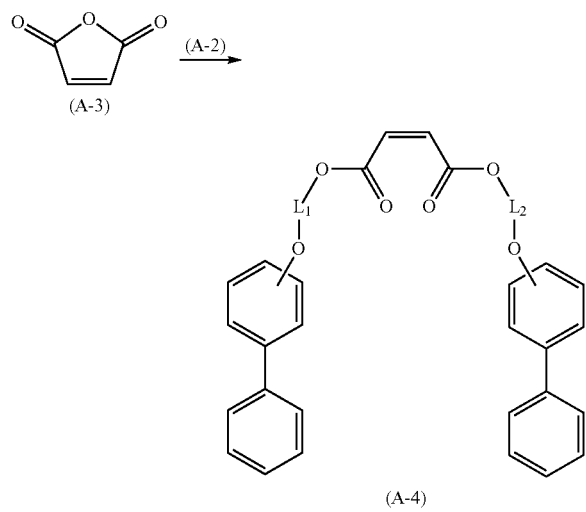

Reaction Formula (3)

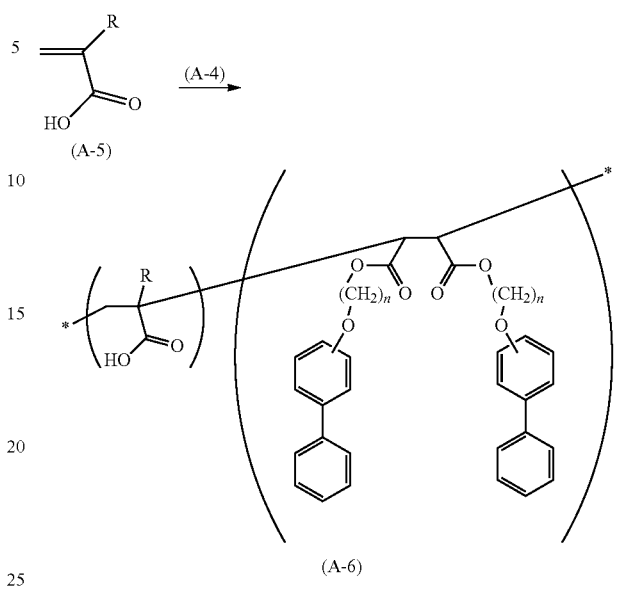

There is no specific limit to the selection of the radical polymerization initiator. The radical polymerization initiator can be selected to particular applications. Specific examples thereof include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrike), azobis(2,2'-isovaleronitrile), and non-cyano-based dimethyl-2,2'azobis isobutylate. Of these, organic peroxides and azo-based compounds are preferable and azo compounds are particularly preferable in terms of easiness of molecular weight control and low resolution temperature.

In addition, there is no specific limit to the content of the radical polymerization initiator and the content can be determined to a particular application. The content thereof is preferably from 1% by weight to 10% by weight based on total weight of the polymerizable monomer.

To control the molecular weight of the copolymer, a chain transfer agent is optionally added.

Specific examples of the chain transfer agents include, but are not limited to, mercapto acetate, mercapto propionate, 2-propane thiol, 2-meracapto ethanol, thiophenol, dodecyl mercaptan, 1-dodecane thiol, and thioglycerol.

There is no specific limit to the polymerization temperature. The polymerization temperature is selected to a particular application. It is preferably from 50° C. to 150° C., and more preferably from 60° C. to 100° C. There is no specific limit to the polymerization time. The polymerization time can suitably be selected to a particular application. It is preferably from 3 hrs to 48 hrs.

Pigments and dyes can be used as the coloring material for the aqueous ink of the present disclosure. With regard to the adsorption power of the copolymer for a coloring material, pigments are superior to dyes. Moreover, pigments are preferable in terms of water resistance and light resistance.

There is no specific limit to the selection of pigments. These can be selected to particular applications. For example, inorganic pigments or organic pigments for black or color are suitable. These can be used alone or in combination.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

Specific examples of the black pigments include, but are not limited to, carbon black (C.I. Pigment Black 7) such as furnace black, lamp black, acetylene black, and channel black, metals such as copper, iron (C.I. Pigment Black 11), metal oxides such as titanium oxides, and organic pigments such as aniline black (C.I. Pigment Black 1).

It is suitable to use carbon black manufactured by a furnace method or channel method, which has a primary, particle diameter of from 15 to 40 nm, a specific surface area of from 50 $m^2/g$ to 300 $m^2/g$ according to BET method, a DPB absorption oil amount of from 40 to 150 mL/100 g, a volatile content of from 0.5% to 10%, and a pH of from 2 to 9.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

Of these pigments, in particular pigments having good affinity with water are preferably used.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

The dye chelates include, but are not limited to, bass dye type chelates, and acid dye type chelates.

There is no specific limit to the selection of the pigment for yellow, which can be selected to a particular application. Specific examples thereof include, but are not limited to, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 120, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 174, and C. I. Pigment Yellow 180.

There is no specific limit to the selection of the pigment for magenta, which can be selected to a particular application. Specific examples thereof include, but are not limited to, C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57:1, C.I. Pigment Red 112, C. I. Pigment Red 122, C. I. Pigment Red 123, C. I. Pigment Red 146, C. I. Pigment Red 168, C. I. Pigment Red 176, C. I. Pigment Red 184, C. I. Pigment Red 185, C. I. Pigment Red 202, and C. I. Pigment Violet 19.

There is no specific limit to the selection of the pigment for cyan, which can be selected to a particular application.

Specific examples thereof include, but are not limited to, C. I. Pigment Blue 1, C. I. Pigment Blue 2, C. I. Pigment Blue 3, C. I. Pigment Blue 15, C. I. Pigment Blue 15:3, C. I. Pigment Blue 15:4, C. I. Pigment Blue 15:34, C. I. Pigment Blue 16, C. I. Pigment Blue 22, C. I. Pigment Blue 60, C. I. Pigment Blue 63, C. I. Pigment Blue 66, C. I. Pigment Pat Blue 4, and C. I. Pigment Pat Blue 60.

By using C. I. Pigment Yellow 74 as yellow pigment, C. I. Pigment Red 122 and C. I. Pigment Violet 19 as magenta pigment, and C. I. Pigment Blue 15:3 as cyan pigment, a well-balanced ink is obtained which has excellent color tone and light resistance.

Colorants newly manufactured for the present disclosure can be used as the ink for the present disclosure.

In addition, in terms of coloring of obtained images, it is suitable to use a self-dispersion pigment and preferable to use anionic self-dispersion pigment. The anionic self-dispersion pigment is formed by introducing an anionic functional group to the surface of a pigment directly or via another atomic group for stable dispersion to stabilize dispersion.

Conventional pigments can be used as the pigment before stable dispersion.

In the anionic functional group, more than a half of hydrogen ions are dissociated at pH 7.0.

Specific examples of the anionic functional groups include, but are not limited to, a carboxyl group, a sulfo group, and a phosphonic acid group. Of these, to improve the optical density of obtained images, a carboxyl group or a phosphonic acid group is preferable.

An anionic functional group is introduced into the surface of a pigment by, for example, oxidation treatment of carbon black.

Specifically, there are methods using hypochlorite, ozone water, hydrogen peroxide, chlorite, or nitric acid for oxidization treatment or methods using a diazonium salt for surface treatment.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

There is no specific limit to the amount of the pigment in an aqueous ink. The amount can be suitably selected to a particular application. The amount preferably ranges from 0.5% to 20% by weight and more preferably ranges from 1% to 10% by weight.

As the dye, dyes classified into acidic dyes, direct dyes, basic dyes, reactive dyes, and food dyes in the color index can be used.

Specific examples of the acid dyes and food dyes include, but are not limited to, C. I. Acid Black 1, 2, 7, 24, 26, and 94, C. I. Acid Yellow 17, 23, 42, 44, 79, and 142, C. I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C. I. Food Black 1 and 2, C. I. Food Yellow 3 and 4, and C. I. Food Red 7, 9, and 14. Specific examples of the direct dyes include, but are not limited to, C. I. Direct Black 19, 22, 32, 38, 51, 56, 71, 74, 75, 77, 154, (168), and 171, C. I. Direct Yellow 1, 12, 24, 26, 33, 44, 50, 86, 120, 132, 142, and 144, C. I. Direct Blue 1, 2, 6, 15, 22, 25, 71, 76, 79, 86, 87, 90, 98, 163, 165, 199, and 202, C. I. Direct Red 1, 4, 9, 13, 17, 20, 28, 31, 39, 80, 81, 83, 89, 225, and 227, and C. I. Direct Orange 26, 29, 62, and 102. Specific examples of the basic dyes include, but are not limited to, C. I. Basic Black 2 and 8, C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112. Specific examples of the reactive dyes include, but are not limited to, C. I. Reactive Black 3, 4, 7, 11, 12, and 17, C. I. Reactive Yellow 1, 5, 11, 13, 14, 20, 21, 22, 25, 40, 47, 51, 55, 65, and 67, C. I. Reactive Blue 1, 2, 7, 14, 15, 23, 32, 35, 38, 41, 63, 80, and 95, and C. I. Reactive Red 1, 14, 17, 25, 26, 32, 37, 44, 46, 55, 60, 66, 74, 79, 96, and 97.

The aqueous ink of the present disclosure preferably includes a hydrosoluble organic solvent in order to enhance the permeation of the aqueous ink into plain paper, coated paper, etc., thereby further suppressing the occurrence of beading and preventing the ink from drying due to moisturizing effect.

There is no specific limit to the selection of the hydrosoluble organic solvent. Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These can be used alone or in combination.

Of these, in terms of prevention of curling of plain paper, preferred are 3-ethyl-3-hydroxymethyloxetane, isopropylidene glycerol, N,N-dimethyl-β-methoxy propionamide, and N,N-dimethyl-β-butoxy propionamide.

Of these, diethylene glycol, triethylene glycol, 1,3-butanediol, 2,2,4-trimethyl-1,3-pentanediol, and glycerin are excellent to prevent discharge failure ascribable to evaporation of water.

Specific examples of the hydrosoluble organic solvents having permeation property and relatively low level of wettability include, but are not limited to, 2-ethyl-1,3-hexanediol [solubility: 4.2% (25° C.)] and 2,2,4-trimethyl-1,3-pentanediol [solubility: 2.0% (25° C.)].

Specific examples of the other hydrosoluble organic solvents include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butane diol, 2,4-dimethyl-2,4-pentane diol, 2,5-dimethyl-2,5-hexane diol, and 5-hexene-1,2-diol.

Other hydrosoluble organic solvents which can be used in combination with the above-described hydrosoluble organic solvent can be appropriately selected to a particular application from alkyl or aryl ethers of polyhydric alcohols such as diethylene glycol monobutyl ether, propyleneglycol monobutyl ether, ethylene glycol monophenyl ether, diethylene glycol monophenyl ether, ethylene glycol monoallyl ether, and tetraethylene glycol chlorophenyl ether; and lower alcohols such as ethanol.

The aqueous ink of the present disclosure preferably includes a surfactant in order to enhance the permeation of the aqueous ink into plain paper, coated paper, etc., thereby further suppressing the occurrence of beading.

As the surfactants, for example, fluorine-containing surfactants, silicone-based surfactants, anionic surfactants, nonionic surfactants, and betaine-based surfactants can be suitably used. These surfactants can be used alone or in combination.

Of these, fluorine-containing surfactants and silicone-based surfactants are preferable because it can lower the surface tension of an ink to 30 mN/m or less.

Specific examples of the nonionic fluorine-containing surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because of its low foaming property and the fluorine containing surfactant represented by the following formula (5) is more preferable.

$$CF_3CF_2(CF_2CF_2)_m\text{—}CF_2CF_2(CF_2CF_2)_nH \quad (5)$$

wherein m represents 0 to 10 and n represents 0 to 40.

Specific examples of the anionic fluorine-based surfactants include, but are not limited to, perfluoroalkyl sulfonic acid compounds, perfluoroalkyl carboxylic acid compounds, perfluoroalkyl phosphoric acid ester compounds, and polyoxyalkylene ether polymer compounds having a perfluoroalkyl ether group in its side chain.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-containing surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, and FS-300 UR (all manufactured by E. I. du Pont de Nemours and Company); FTERGENT FT-110, FT-250, FT-251, FT-400S, FT-150, and FT-400SW (all manufactured by NEOS COMPANY LIM- ITED); and POLYFOX PF-136A, PF-156A, PF-151N, PF-154, PF-159 (manufactured by OMNOVA SOLUTIONS INC.).

Of these, in terms of print quality, coloring and uniform dyeing for paper in particular, FS-300 (manufactured by E. I. du Pont de Nemours and Company), FTERGENT FT-110, FT-250, FT-251, FT-400S, FT-150 and FT-400SW (all manufactured by NEOS COMPANY LIMITED), and POLYFOX PF-151N (manufactured by OMNOVA SOLUTIONS INC.).

There is no specific limit to the silicone-based surfactant. The silicone-based surfactant can be suitably selected to a particular application. Specific examples thereof include, but are not limited to, side-chain-modified polydimethyl siloxane, both end-modified polydimethylsiloxane, one end modified polydimethylsiloxane, and side-chain both end modified polydimethylsiloxane. In particular, a polyether-modified silicone-containing surfactant that has a polyoxyethylene group or a polyoxyethylene polyoxypropylene group is preferable because of its good characteristics as an aqueous surfactant.

Commercial silicone-based surfactants are easily available from, for example, BYK Japan KK, Shin-Etsu Chemical Co., Ltd., Dow Corning Toray Silicone Co., Ltd., NINON EMULSION Co., Ltd., or Kyoeisha Chemical Co., Ltd.

Specific examples of the anionic surfactants include, but are not limited to, polyoxyethylene alkyl ether acetates, dodecyl benzene sulfonates, laurates, and salts of polyoxyethylene alkyl ether sulfates.

Specific examples of the nonionic surface active agents include, but are not limited to, polyoxyethylene alkyl ether, polyoxypropylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

Known additives such as pH regulators, preservatives and fungicides, corrosion inhibitors, anti-oxidants, ultraviolet absorbers, oxygen absorbers, and light stabilizers can be optionally selected and added to the ink of the present disclosure.

The pH regulator can be any agent capable of adjusting the pH in the range of from 8.5 to 11 without having an adverse impact on formulated ink and suitably selected to a particular application. Specific examples thereof include, but are not limited to, alcohol amines, hydroxides of alkali metal elements, hydroxides of ammonium, phosphonium hydroxides, and alkali metal carbonates. Specific examples of the alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide. Specific examples of the hydroxides of ammonium include, but are not limited to, ammonium hydroxide and quaternary ammonium hydroxide. A specific example of the phosphonium hydroxides is quaternary phosphonium hydroxide. Specific examples of the alkali metal carbonates include, but are not limited to, lithium carbonate, sodium carbonate, and potassium carbonate.

Specific examples of the preservatives and fungicides include, but are not limited, dehydrosodium acetate, sodium sorbinate, 2-pyridine thiol-1-oxide sodium, sodium benzoate, and pentachlorophenol sodium.

Specific examples of the corrosion inhibitors include, but are not limited to, acid sulfite, thiosodium sulfate, thiodiglycolate ammonium, diisopropyl ammonium nitrite, pentaerythritol tetranitrate, and dicyclohexyl ammonium nitrite.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

The aqueous ink of the present disclosure can be produced by, for example, dispersing or dissolving, in an aqueous medium, water, a hydrosoluble organic solvent, a pigment, the above-described copolymer, and optional other components followed by stirring and mixing. The copolymer may be used as a pigment dispersion resin during preparation of a pigment dispersion element.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc. During the production, coarse particles are optionally filtered off with a filter, a centrifuge, etc. optionally followed by degassing.

There is no specific limit to the properties of the aqueous ink of the present disclosure, which can be suitably selected to a particular application. For example, the viscosity, the surface tension, etc. are preferable in the following ranges.

The viscosity of the ink is from 3 to 20 mPa·S at 25° C. When the ink viscosity is 3 mPa·S or greater, the printing density and the printing quality of the ink are improved. When the ink viscosity is 20 mPa·s or less, a suitable ink discharging property is secured.

The viscosity can be measured by, for example, a viscometer (RE-80L, manufactured by TOKI SANGYO CO., LTD.) at 25° C.

The surface tension of the aqueous ink is preferably 40 mN/m or less at 25° C.

The ink cartridge of the present disclosure has the aqueous ink in a container and other optional other members.

There is no specific limit to the container. The form, the structure, the size, and the material thereof can be suitably determined to particular applications. For example, a container having at least an ink bag formed of aluminum laminate film, a resin film, etc. is suitable.

Figure 2:
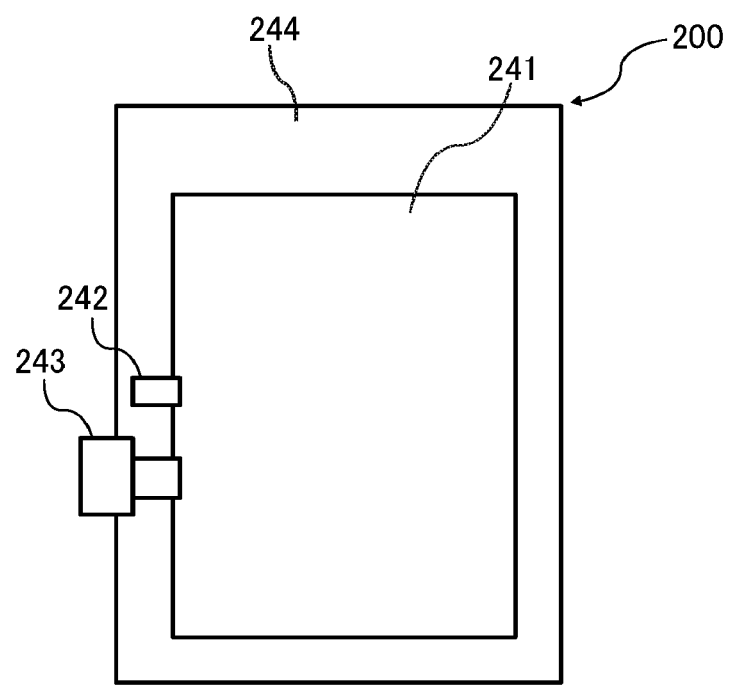
FIG. 2 is a schematic view illustrating the embodiment in FIG. 1 including an external case.

Next, the ink cartridge is described in detail with reference to FIGS. 1 and 2. FIG. 1 is a diagram illustrating an example of the ink cartridge. FIG. 2 is a view illustrating the ink cartridge illustrated in FIG. 1 including the housing thereof. In an ink cartridge 200, an ink is supplied to an ink bag 241 through an ink inlet 242, the air remaining in the ink accommodating unit 241 is discharged, and thereafter the ink inlet 242 is closed by fusion. When in use, an ink outlet 243 made of rubber is pierced by the needle installed onto an inkjet recording device to supply the ink into the device. The ink bag 241 is formed of a packaging material such as aluminum laminate film having no air permeability. The ink bag 241 is accommodated in a cartridge case 244 made of plastic as illustrated in FIG. 2 and detachably attachable to an inkjet recording device for use.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

The molecular weight of the copolymers obtained in Examples and Comparative Examples were obtained as follows:

<Measuring of Molecular Weight of Copolymer>

The molecular weight of a copolymer was measured by a typical gel permeation chromatography (GPC) under the following conditions:

Device: GPC-8020 (manufactured by TOSOH CORPORATION)
Column: TSK G2000 HXL and G4000 HXL (manufactured by TOSOH CORPORATION)
Temperature: 40° C.
Solvent: tetrahydrofuran (THF)
Flow speed: 1.0 ml/min 1 mL of the copolymer having a concentration of 0.5 percent by weight was infused into the column and the number-average molecular weight Mn and the weight-average molecular weight Mw were calculated by using the molecular weight calibration curve obtained based on a simple dispersion polystyrene standard sample from the molecular weight distribution of the copolymer measured under the conditions specified above.

Example 1 (Synthesis Example 1)

Synthesis of Copolymer 1

Seventy-eight point five (78.5) g (461 mmol) of 2-phenylphenol from Tokyo Chemical Industry Co., Ltd. were dissolved in 600 mL of methyl ethyl ketone from Kanto Chemical Co., Inc. to prepare a solution. One hundred ninety one (191) g (1.38 mol) of sodium carbonate from Kanto Chemical Co., Inc. and 100 g (553 mmol) of 6-bromo-1-hexanol from Tokyo Chemical Industry Co., Ltd. were added to the solution, and refluxed for 8 hrs. After the solution was cooled to have room temperature, it was filtered and a solvent was removed therefrom. The residue was dissolved in methylene chloride from Junsei Chemical Co., Ltd. and washed with water. The isolated organic layer was dried with magnesium sulfide from Kanto Chemical Co., Inc., and a solvent was removed therefrom. The residue was refined by silica gel column chromatography using a mixed solvent in which a volume ratio of methylene chloride from Junsei Chemical Co., Ltd. to methanol from Kanto Chemical Co., Inc. is 99/1 as an eluent to obtain 105.3 g of 6-(2-phenyl-phenoxy)hexane-1-ol.

Next, 3.84 g (39.2 mmol) of maleic acid anhydride from Tokyo Chemical Industry Co., Ltd. and 21.70 g (80.3 mmol) of 6-(2-phenyl-phenoxy)hexane-1-ol were dissolved in 20 ml of dry methyl ethyl ketone from Kanto Chemical Co., Inc. under Ar stream to prepare a solution. A solution including 0,478 g of dimethylamino pyridine from Tokyo Chemical Industry Co., Ltd. dissolved in 30 mL of dehydrated methylene chloride from Kanto Chemical Co., Inc was added to the solution. Next, a solution including 8.48 g of N,N'-dicyclohexyl carbodiimide from Tokyo Chemical Industry Co., Ltd. dissolved in 20 mL of dehydrated methylene chloride from Kanto Chemical Co., Inc. was added to the solution, and the solution was stirred for 20 hrs. The reactant mixture was washed with water and dried with magnesium sulfide from Kanto Chemical Co., Inc., and a solvent was removed therefrom. The residue was refined by silica gel column chromatography using a mixed solvent in which a volume ratio of methylene chloride from Junsei Chemical Co., Ltd. to hexane from Kanto Chemical Co., Inc. is 8/2 as an eluent to obtain a maleic acid derivative having the following formula (I).

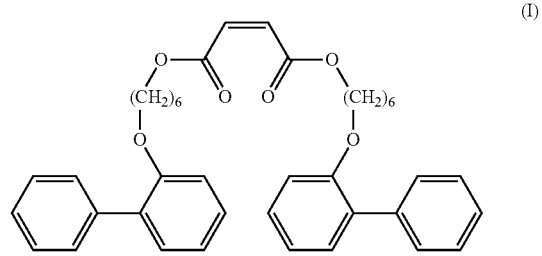

(I)

Next, 6.89 g (11.1 mmol) of the maleic acid derivative having the formula (I) were dissolved in 15 mL of methyl ethyl ketone from Kanto Chemical Co., Inc. under Ar stream and the solution was heated to have a temperature of 75° C. A solution including 0.80 g (11.1 mmol) of an acrylic acid from Sigma-Aldrich dissolved in 10 mL of methyl ethyl ketone from Kanto Chemical Co., Inc. was dropped in the solution for 2 hrs and stirred at 75° C. for 5 hrs. The solution was cooled to have room temperature and thrown in hexane from Kanto Chemical Co., Inc. The precipitated copolymer was filtered and dried under reduced pressure to obtain 8.2 of a copolymer 1 having an Mw of 8,200 and an Mn of 2,700.

Next, 2.0 of the copolymer 1 were dissolved in an aqueous solution of tetraethylammonium hydroxide from Tokyo Chemical Industry Co., Ltd. to prepare an aqueous solution of the copolymer 1 having a concentration of the copolymer of 2.38% and a pH of 8.0.

Example 2 (Synthesis Example 2)

Synthesis of Copolymer 2

The procedure for preparation of the maleic acid derivative having the formula (I) in Synthesis Example 1 was repeated except for replacing 6-bromo-1-hexanol with 2-bromoethanol from Tokyo Chemical Industry Co, Ltd. to obtain a maleic acid derivative having the following formula (II).

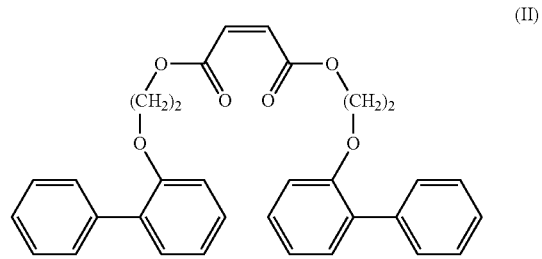

(II)

Next, the procedures for preparation of the copolymer 1 and the aqueous solution thereof in Synthesis Example 1 were repeated except for replacing the maleic acid derivative having the formula (I) with the maleic acid derivative having the formula (II) to obtain a copolymer 2 having an Mw of 8,400 and an Mn of 2,900 and prepare an aqueous solution thereof.

Example 3 (Synthesis Example 3)

Synthesis of Copolymer 3

The procedure for preparation of the maleic acid derivative having the formula (I) in Synthesis Example 1 was repeated except for replacing 6-bromo-1-hexanol with 12-bromododecanol from Tokyo Chemical Industry Co., Ltd. to obtain a maleic acid derivative having the following formula (III).

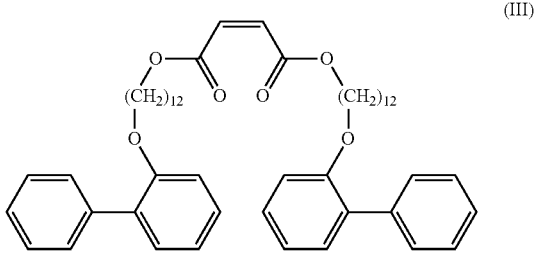

(III)

Next, the procedures for preparation of the copolymer 1 and the aqueous solution thereof in Synthesis Example 1 were repeated except for replacing the maleic acid derivative having the formula (I) with the maleic acid derivative having the formula (III) to obtain a copolymer 3 having an Mw of 9,400 and an Mn of 3,800 and prepare an aqueous solution thereof.

Example 4 (Synthesis Example 4)

Synthesis of Copolymer 4

The procedures for preparation of the copolymer 1 and the aqueous solution thereof in Synthesis Example 1 were repeated except for replacing the acrylic with the methacrylic acid from Sigma-Aldrich to obtain a copolymer 4 having an Mw of 8,600 and an Mn of 3,100 and prepare an aqueous solution thereof.

Example 5 (Synthesis Example 5)

Synthesis of Copolymer 5

The procedures for preparation of the copolymer 1 and the aqueous solution thereof in Synthesis Example 1 were repeated except that a molar ratio of the acrylic acid for the formula (1) to the maleic acid derivative having the formula (I) for the formula (2) 3/1 to obtain a copolymer 5 having an Mw of 7,500 and an Mn of 3,000 and prepare an aqueous solution thereof.

Example 6 (Synthesis Example 6)

Synthesis of Copolymer 6

The procedures for preparation of the copolymer 1 and the aqueous solution thereof in Synthesis Example 1 were repeated except that a molar ratio of the acrylic acid for the formula (1) to the maleic acid derivative having the formula (I) for the formula (2) 5/1 to obtain a copolymer 6 having an Mw of 7,800 and an Mn of 3,200 and prepare an aqueous solution thereof.

Example 7 (Synthesis Example 7)

Synthesis of Copolymer 7

The procedures for preparation of the copolymer 1 and the aqueous solution thereof in Synthesis Example 1 were repeated except that a molar ratio of the acrylic acid for the formula (1) to the maleic acid derivative having the formula (I) for the formula (2) 6/1 to obtain a copolymer 7 having an Mw of 7,600 and an Mn of 2,900 and prepare an aqueous solution thereof.

Example 8 (Synthesis Example 8)

The procedure for preparation of the aqueous solution of the copolymer 1 in Synthesis Example 1 was repeated except for replacing the aqueous solution of tetraethylammonium hydroxide with an aqueous solution of sodium hydroxide from Kanto Chemical Co., Inc. to prepare another aqueous solution of the copolymer 1.

Example 9 (Synthesis Example 9)

Synthesis of Copolymer 9

The procedure for preparation of the copolymer 1 in Synthesis Example 1 was repeated except for replacing the acrylic with the methacrylic acid from Sigma-Aldrich and the maleic acid derivative having the formula (I) with the maleic acid derivative having the formula (III), and except that a molar ratio of the methacrylic acid for the formula (1) to the maleic acid derivative having the formula (I) for the formula (2) is 10/1 to obtain a copolymer 9 having an Mw of 7,200 and an Mn of 2,600. The procedure for preparation of the aqueous solution in Synthesis Example 8 was repeated except for replacing the copolymer 1 with the copolymer 9 to prepare an aqueous solution thereof.

Example 10 (Synthesis Example 10)

Synthesis of Copolymer 10

The procedure for preparation of the maleic acid derivative having the formula (I) in Synthesis Example 1 was repeated except for replacing 2-phenyl phenol with 3-phenyl phenol from Tokyo Chemical Industry Co., Ltd. to obtain a maleic acid derivative having the following formula (IV)

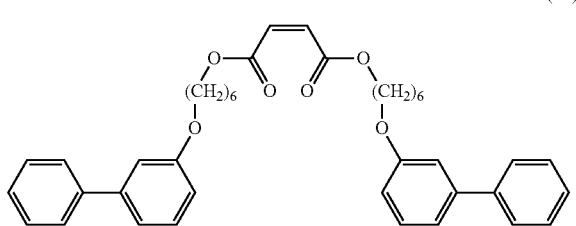

(IV)

Next, the procedures for preparation of the copolymer 1 and the aqueous solution thereof in Synthesis Example 1 were repeated except for replacing the maleic acid derivative having the formula (I) with the maleic acid derivative having the formula (IV) to obtain a copolymer 10 having an Mw of 8,100 and an Mn of 2,800 and prepare an aqueous solution thereof.

Example 11 (Synthesis Example 11)

Synthesis of Copolymer 11

The procedure for preparation of the maleic acid derivative having the formula (1) in Synthesis Example 1 was repeated except for replacing 2-phenyl phenol with 4-phenyl phenol from Tokyo Chemical Industry Co., Ltd. to obtain a maleic acid derivative having the following formula (V).

(V)

Next, the procedures for preparation of the copolymer 1 and the aqueous solution thereof in Synthesis Example 1 were repeated except for replacing the maleic acid derivative having the formula (I) with the maleic acid derivative having the formula (V) to obtain a copolymer 11 having an Mw of 8,500 and an Mn of 3,300 and prepare an aqueous solution thereof.

(Example 12 (Synthesis Example 12)

Synthesis of Copolymer 12

Eight point sixty nine (8.69) g (14.0 mmol) of the maleic acid derivative having the formula (I) were dissolved in 1.01 g (14.0 mmol) of the acrylic acid from Sigma-Aldrich to prepare a solution. Ten point 0 (10.0) g of ion-exchanged water, 0.30 g of Aquaron KH-10 (anionic radical surfactant from DKS Co., Ltd.), and 10 g of ammonium persulfate from Tokyo Chemical Industry Co., Ltd. were mixed in homomixer to form a preemulsion. Next, 0.2 g of Aquaron KH-10 were added to 10.0 g of ion-exchanged water, and the mixture was heated to have a temperature of 80° C. under an argon stream. Ten (10) percent of the preemulsion were added to the mixture and initially polymerized for 30 min. Next, the remaining preemulsion was polymerized while dropped for 2 hrs, and further polymerized at 80° C. for 2 hrs. After cooled, the mixture was filtered and neutralized with ammonia water from Kanto Chemical Co., Inc. to obtain a copolymer 12 having a solid content concentration of 30%, an Mw of 17,000 and an Mn of 9,600.

Example 13 (Synthesis Example 13)

Synthesis of Copolymer 13

Eight point sixty nine (9.31) g (15.0 mmol) of the maleic acid derivative having the formula (1) were dissolved in 3.87 g (45.0 mmol) of the methacrylic acid from Sigma-Aldrich to prepare a solution. Thirteen point 0 (13.0) g of ion-exchanged water, 0.40 g of Aquaron KH-10 (anionic radical surfactant from DKS Co., Ltd.), and 0.13 g of ammonium persulfate from Tokyo Chemical Industry Co., Ltd. were mixed in homomixer to form a preemulsion. Next, 0.2 g of Aquaron KH-10 were added to 10.0 g of ion-exchanged water, and the mixture was heated to have a temperature of 80° C. under an argon stream. Ten (10) percent of the preemulsion were added to the mixture and initially polymerized for 30 min. Next, the remaining preemulsion was polymerized while dropped for 2 hrs, and further polymerized at 80° C. for 2 hrs After cooled, the mixture was filtered and neutralized with ammonia water from Kanto Chemical Co., inc. to obtain a copolymer 13 having a solid content concentration of 30%, an Mw of 17,000 and an Mn of 9.200.

Comparative Example 1 (Comparative Synthesis Example 1)

Synthesis of Comparative Copolymer 1

Five point zero and zero (5.00) g (50.0 mmol) of maleic acid anhydride from Tokyo Chemical Industry Co., Ltd. and 10.7 g (105 mmol) of 1-hexanol were dissolved in 20 ml of dry methyl ethyl ketone from Kanto Chemical Co., Inc. under Ar stream to prepare a solution. After the solution was refluxed for 12 hrs, it was cooled to have room temperature and a solvent was removed therefrom. The residue was dissolved in 20 mL of dehydrated 0.10 methylene chloride from Kanto Chemical Co., Inc., and 11.1 g (11 mmol) of tetraethyl amine from Tokyo Chemical Industry Co., Ltd. and 0.610 g (5.00 mmol) of 4-dimethylamino pyridine from Tokyo Chemical Industry Co., Ltd. were added to the solution. While the resultant solution was stirred under an Ar stream at room temperature, 20.6 g (60.0 mmol) of 2-methyl-6-nitrobenzoic acid anhydride from Tokyo Chemical Industry Co., Ltd. were added thereto. Then, the solution was stirred for 24 hrs and an aqueous solution of saturated ammonium chloride from Tokyo Chemical Industry Co., Ltd. was added thereto. After the reactant mixture was extracted with methylene chloride from Junsei Chemical Co., Ltd. and washed with water, the isolated organic layer was dried with magnesium sulfide from Kanto Chemical Co., Inc., and a solvent was removed therefrom. The residue was refined by silica gel column chromatography using a mixed solvent in which a volume ratio of methylene chloride from Junsei Chemical Co., Ltd. to methanol from Kanto Chemical Co., Inc. is from 99.5/0.5 to 99/1 as an eluent to obtain a maleic acid derivative having the following formula (VI).

(VI)

Next, the procedures for preparation of the copolymer 1 and the aqueous solution thereof in Synthesis Example 1 were repeated except for replacing the maleic acid derivative having the formula (I) with the maleic acid derivative having the formula (VI) to obtain 6.78 g of a comparative copolymer 1 having an Mw of 7,000 and an Mn of 2,400 and prepare an aqueous solution thereof.

Comparative Example 2 (Comparative Synthesis Example 2)

Synthesis of Comparative Copolymer 2

The procedures for preparation of the copolymer 13 and the aqueous solution thereof in Synthesis Example 13 were repeated except for replacing the maleic acid derivative having the formula (I) with the maleic acid derivative having the formula (VI) to obtain a comparative copolymer 2 having an Mw of 14,000 and an Mn of 9,000 and prepare an aqueous solution thereof.

The copolymers in Synthesis Examples 1 to 13 and Comparative Synthesis Examples 1 and 2 are shown in Table 1.

TABLE 1(1)

| Synthesis Example | Copolymer | (1)/(2) (Molar Ratio) | R | X |
|---|---|---|---|---|
| Synthesis Example 1 | Copolymer 1 | 1/1 | H | TEA |
| Synthesis Example 2 | Copolymer 2 | 1/1 | H | TEA |
| Synthesis Example 3 | Copolymer 3 | 1/1 | H | TEA |
| Synthesis Example 4 | Copolymer 4 | 1/1 | $CH_3$ | TEA |
| Synthesis Example 5 | Copolymer 5 | 3/1 | H | TEA |
| Synthesis Example 6 | Copolymer 6 | 5/1 | H | TEA |
| Synthesis Example 7 | Copolymer 7 | 6/1 | H | TEA |
| Synthesis Example 8 | Copolymer 1 | 1/1 | H | $Na^+$ |
| Synthesis Example 9 | Copolymer 9 | 10/1 | $CH_3$ | $Na^+$ |
| Synthesis Example 10 | Copolymer 10 | 1/1 | H | TEA |
| Synthesis Example 11 | Copolymer 11 | 1/1 | H | TEA |
| Synthesis Example 12 | Copolymer 12 | 1/1 | H | TEA |
| Synthesis Example 13 | Copolymer 13 | 3/1 | $CH_3$ | TEA |
| Comparative Synthesis Example 1 | Comparative Copolymer 1 | 1/1 | H | TEA |
| Comparative Synthesis Example 2 | Comparative Copolymer 2 | 3/1 | H | TEA |

TEA: tetraethyl ammonium ion

TABLE 1(2)

| Synthesis Example | L1 | L2 | Phenyl Bond Site | Polymerization Method | Mw | Mn |
|---|---|---|---|---|---|---|
| Synthesis Example 1 | —$(CH_2)_6$— | —$(CH_2)_6$— | Ortho | S | 8200 | 2700 |
| Synthesis Example 2 | —$(CH_2)_2$— | —$(CH_2)_2$— | Ortho | S | 8400 | 2900 |
| Synthesis Example 3 | —$(CH_2)_{12}$— | —$(CH_2)_{12}$— | Ortho | S | 9400 | 3800 |
| Synthesis Example 4 | —$(CH_2)_6$— | —$(CH_2)_6$— | Ortho | S | 8600 | 3100 |
| Synthesis Example 5 | —$(CH_2)_6$— | —$(CH_2)_6$— | Ortho | S | 7500 | 3000 |
| Synthesis Example 6 | —$(CH_2)_6$— | —$(CH_2)_6$— | Ortho | S | 7800 | 3200 |
| Synthesis Example 7 | —$(CH_2)_6$— | —$(CH_2)_6$— | Ortho | S | 7600 | 2900 |
| Synthesis Example 8 | —$(CH_2)_6$— | —$(CH_2)_6$— | Ortho | S | 8200 | 2700 |
| Synthesis Example 9 | —$(CH_2)_{12}$— | —$(CH_2)_{12}$— | Ortho | S | 7200 | 2600 |
| Synthesis Example 10 | —$(CH_2)_6$— | —$(CH_2)_6$— | Metha | S | 8100 | 2800 |
| Synthesis Example 11 | —$(CH_2)_6$— | —$(CH_2)_6$— | Para | S | 8500 | 3300 |
| Synthesis Example 12 | —$(CH_2)_6$— | —$(CH_2)_6$— | Ortho | E | 17000 | 9600 |
| Synthesis Example 13 | —$(CH_2)_6$— | —$(CH_2)_6$— | Ortho | E | 17000 | 9200 |
| Comparative Synthesis Example 1 | —$(CH_2)_6$— | —$(CH_2)_6$— | — | S | 7000 | 2400 |
| Comparative Synthesis Example 2 | —$(CH_2)_6$— | —$(CH_2)_6$— | — | E | 14000 | 9000 |

Phenyl bond site is a bond site of a phenyl group relative to phenoxy group.
S and E represent solution polymerization and emulsification polymerization, respectively.
A pendant terminal group of the formula (2) in each of comparative copolymers 1 and 2 is not biphenyl.

Example 21

Preparation of Aqueous Ink 1

(Preparation of Pigment Dispersion 1)
Sixteen point zero (16.0) parts of carbon black (NIPEX150 from Degussa AG) was added to 84.0 parts of the aqueous solution of copolymer 1 prepared in Synthesis Example 1 followed by stirring for 12 hrs. The obtained mixture was subject to circulation dispersion at a peripheral speed of 10 m/s for 1 hr using a disk type bead mill (KDL type, media: zirconia ball having a diameter of 0.1 mm, manufactured by Shinmaru Enterprises Corporation) followed by filtration by a membrane filter having an opening diameter of 1.2 μm. Thereafter, ion-exchanged water was added to the filtered mixture to obtain 95.0 parts of a pigment dispersion 1 (pigment solid content concentration: 16%).
(Preparation of Ink)
Forty-five point zero (45.0) parts of the pigment dispersion 1, 10.0 parts of 1,3-butanediol, 10.0 parts of glycerin, 10.0 parts of 3-methoxy-N,N-diemthyl propionamide, 1.0 part of fluorine-containing surfactant (ZONYL™ FS-300, solid content: 40% by weight, from E. I. du Pont de Nemours and Company), and 24.0 parts of ion-exchanged water were mixed followed by stirring for 1 hr and filtration by a membrane filter having an opening diameter of 1.2 μm to obtain an aqueous ink 1 of the present invention.

Example 22

Preparation of Aqueous Ink 2

The procedure for preparation of the pigment dispersion 1 in Example 21 was repeated except for replacing the aqueous solution of copolymer 1 with that of copolymer 2 to prepare a pigment dispersion 2.

Next, the procedure for preparation of the aqueous ink 1 in Example 21 was repeated except for replacing the pigment dispersion 1 with the pigment dispersion 2 to prepare an aqueous ink 2 of the present invention.

Example 23

Preparation of Aqueous Ink 3

The procedure for preparation of the pigment dispersion 1 in Example 21 was repeated except for replacing the carbon black (NIPEX 150 from Degussa AG) with Pigment Blue 15:-11 (Chromofine Blue from Dainichiseika Color & Chemicals Mfg. Co., Ltd.) and changing the solid content to 20.0% to prepare a pigment dispersion 3.

Next, 30.0 parts of the pigment dispersion element 3, 15.0 parts of 1,3-butanediol, 10.0 parts of glycerin, 20.0 parts of 3-methoxy-N,N-diemthyl propionamide, 1.0 part of fluorine-containing surfactant (ZONYL™ FS-300, solid content: 40% by weight, from E. I. du Pont de Nemours and Company), and 24.0 parts of ion-exchanged water were mixed followed by stirring for 1 hr and filtration by a membrane filter having an opening diameter of 1.2 μm to obtain an aqueous ink 3 of the present invention.

Example 24

Preparation of Aqueous Ink 4

The procedure for preparation of the pigment dispersion 1 in Example 21 was repeated except for replacing the carbon black (NIPEX 150 from Degussa AG) with Pigment Red 122 (magenta pigment: Toner Magenta EO02 from Clariant Japan K.K.) and changing the solid content to 20.0% to prepare a pigment dispersion 4.

Next, the procedure for preparation of the aqueous ink 1 in Example 21 was repeated except for replacing the pigment dispersion 1 with the pigment dispersion 4 to prepare an aqueous ink 4 of the present invention.

Example 25

Preparation of Aqueous Ink 5

The procedure for preparation of the pigment dispersion 1 in Example 21 was repeated except for replacing the carbon black (NIPEX 150 from Degussa AG) with a yellow pigment (Fast Yellow 531 from Dainichiseika Color & Chemicals Mfg. Co., Ltd.) and changing the solid content to 20.0% to prepare a pigment dispersion 5.

Next, the procedure for preparation of the aqueous ink 3 in Example 23 was repeated except for replacing the pigment dispersion 3 with the pigment dispersion 5 to prepare an aqueous ink 5 of the present invention.

Example 26

Preparation of Aqueous Ink 6

The procedure for preparation of the pigment dispersion 1 in Example 21 was repeated except for replacing the aqueous solution of copolymer 1 with that of copolymer 3 to prepare a pigment dispersion 6.

Next, the procedure for preparation of the aqueous ink 1 in Example 21 was repeated except for replacing the pigment dispersion 1 with the pigment dispersion 6 to prepare an aqueous ink 6 of the present invention.

Example 27

Preparation of Aqueous Ink 7

The procedure for preparation of the pigment dispersion 1 in Example 21 was repeated except for replacing the aqueous solution of copolymer 1 with that of copolymer 4 to prepare a pigment dispersion 7.

Next, the procedure for preparation of the aqueous ink 1 in Example 21 was repeated except for replacing the pigment dispersion 1 with the pigment dispersion 7 to prepare an aqueous ink 7 of the present invention.

Example 28

Preparation of Aqueous Ink 8

The procedure for preparation of the pigment dispersion 1 in Example 21 was repeated except for replacing the aqueous solution of copolymer 1 with that of copolymer 5 to prepare a pigment dispersion 8.

Next, the procedure for preparation of the aqueous ink 1 in Example 21 was repeated except for replacing the pigment dispersion 1 with the pigment dispersion 8 to prepare an aqueous ink 8 of the present invention.

Example 29

Preparation of Aqueous Ink 9

The procedure for preparation of the pigment dispersion 1 in Example 21 was repeated except for replacing the aqueous solution of copolymer 1 with that of copolymer 6 to prepare a pigment dispersion 9.

Next, the procedure for preparation of the aqueous ink 1 in Example 21 was repeated except for replacing the pigment dispersion 1 with the pigment dispersion 9 to prepare an aqueous ink 9 of the present invention.

Example 30

Preparation of Aqueous Ink 10

The procedure for preparation of the pigment dispersion 1 in Example 21 was repeated except for replacing the aqueous solution of copolymer 1 with that of copolymer 7 to prepare a pigment dispersion 10.

Next, the procedure for preparation of the aqueous ink 1 in Example 21 was repeated except for replacing the pigment dispersion 1 with the pigment dispersion 10 to prepare an aqueous ink 10 of the present invention.

Example 31

Preparation of Aqueous Ink 11

The procedure for preparation of the pigment dispersion 1 in Example 21 was repeated except for replacing the aqueous solution of copolymer 1 with that of copolymer 8 to prepare a pigment dispersion 11.

Next, the procedure for preparation of the aqueous ink 1 in Example 21 was repeated except for replacing the pigment dispersion 1 with the pigment dispersion 11 to prepare an aqueous ink 11 of the present invention.

Example 32

Preparation of Aqueous Ink 12

The procedure for preparation of the pigment dispersion 1 in Example 21 was repeated except for replacing the aqueous solution of copolymer 1 with that of copolymer 9 to prepare a pigment dispersion 12.

Next, the procedure for preparation of the aqueous ink 1 in Example 21 was repeated except for replacing the pigment dispersion 1 with the pigment dispersion 12 to prepare an aqueous ink 12 of the present invention.

Example 33

Preparation of Aqueous Ink 13

The procedure for preparation of the pigment dispersion 1 in Example 21 was repeated except for replacing the aqueous solution of copolymer 1 with that of copolymer 10 to prepare a pigment dispersion 13.

Next, the procedure for preparation of the aqueous ink 1 in Example 21 was repeated except for replacing the pigment dispersion 1 with the pigment dispersion 13 to prepare an aqueous ink 13 of the present invention.

Example 34

Preparation of Aqueous Ink 14

The procedure for preparation of the pigment dispersion 1 in Example 21 was repeated except for replacing the aqueous solution of copolymer 1 with that of copolymer 11 to prepare a pigment dispersion 14.

Next, the procedure for preparation of the aqueous ink 1 in Example 21 was repeated except for replacing the pigment dispersion 1 with the pigment dispersion 14 to prepare an aqueous ink 14 of the present invention.

Example 35

Preparation of Aqueous Ink 15

The following materials were mixed and stirred for 30 min to prepare an aqueous solution 1.
2-ethyl-1,3-hexane diol: 2.00 parts
Glycerol: 10.00 parts
3-methoxy-N,N-dimethyl propane amide: 15.00 parts
3-buthoxy-N,N-dimethyl propane amide: 15.00 parts
2-(cyclohexylamino) ethane sulfonic acid: 0.05 parts
2,4,7,9-tetramethyl-4,7-decanediol: 0.50 parts
Fluorine-containing surfactant: (ZONYL FS-300 from E. I. du Pont de Nemours and Company): 0.25 parts
Diethanol amine: 0.01 parts
Ion-exchanged water: 12.93 parts Thereafter, 50 g of dry carbon black, 100 mL of ion-exchanged water, and 15.5 g (50 mmol) of the compound having the following formula (6) were mixed. The mixture was heated to 60° C. while stirred at 300 rpm. Fifty (50) mmol of 20% sodium nitrite aqueous solution were added to the mixture in 15 min. Thereafter, the resultant was stirred at 60° C. for 3 hrs. The resultant was diluted with 75 mL of ion-exchanged water followed by filtration Ion-exchanged water was added to the filtrate in such a manner that the solid content concentration thereof was 20.0% to obtain pigment dispersion of carbon black.

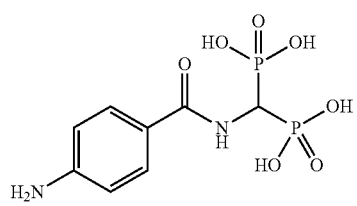

(6)

Thereafter, 37.50 parts of the pigment dispersion 15 were added to the aqueous solution 1 followed by stirring for 30 min. Furthermore, 6.67 parts of the copolymer 12 (solid content concentration: 30%) were added to the solution followed by stirring for 30 min. Thereafter, an aqueous ink 15 of the present invention was obtained by filtering the resultant with a membrane filter having a hole diameter of 1.2 μm.

Example 36

Preparation of Aqueous Ink 16

The following materials were mixed and stirred for 30 min to prepare an aqueous solution 2.
2-ethyl-1,3-hexane diol: 2.00 parts
Glycerol: 10.00 parts
3-methoxy-N,N-dimethyl propane amide: 20.00 parts
3-buthoxy-N,N-dimethyl propane amide: 20.00 parts
2-(cyclohexylamino) ethane sulfonic acid: 0.05 parts
2,4,7,9-tetramethyl-4,7-decanediol: 0.50 parts
Fluorine-containing surfactant: (ZONYL FS-300 from E. I. du Pont de Nemours and Company): 0.25 parts
Diethanol amine: 0.01 parts
Ion-exchanged water: 17.93 parts Thereafter, 4.50 g of p-amino benzoate were added to 150 g of ion-exchanged water heated to 60° C. followed by mixing at 8,000 rpm for 10 min. Immediately after a solution in which 1.80 g of sodium nitrite was dissolved in 15 g of ion-exchanged water was added to this mixture, 20 g of copper phthalocyanine pigment (PB15:4, manufactured by Sun Chemical Corporation) were added followed by mixing at 8,500 rpm for 1 hr. Furthermore, a solution in which 4.5 g of p-amino benzoic acid was dissolved in 15 g of ion-exchanged water was added followed by mixing at 65° C. at 8,500 rpm for 3 hrs. The thus-obtained reaction mixture was filtered by a mesh of 200 nm. Subsequent to rinsing with water, the thus-obtained cyan pigment was dispersed in water. Coarse particles were removed by centrifugal and ion-exchanged water was added in such a manner that the solid portion concentration was 20.0% to obtain a cyan pigment dispersion 16 having a surface treated with p-amino benzoic acid.

Thereafter, 22.50 parts of the pigment dispersion 16 were added to the aqueous solution 2 followed by stirring for 30 min. Furthermore, 6.67 parts of the copolymer 13 (solid content concentration: 30%) were added to the solution followed by stirring for 30 min. Thereafter, an aqueous ink 16 of the present invention was obtained by filtering the resultant with a membrane filter having a hole diameter of 1.2 μm.

Example 37

Preparation of Aqueous Ink 17

The aqueous solution 1 was prepared in the same manner as in Example 35.

Thereafter, 4.50 g of sulphanilic acid were added to 150 g of ion-exchanged water heated to 60° C. followed by mixing at 8,000 rpm for 10 min. Immediately after a solution in which 1.80 g of sodium nitrite was dissolved in 15 g of ion-exchanged water was added to this mixture, 20 g of magenta pigment (PR122 from Sun Chemical Corporation) were added followed by mixing at 8,500 rpm for 1 hr. Furthermore, a solution in which 4.5 g of sulphanilic acid was dissolved in 15 g of ion-exchanged water was added followed by mixing at 65° C. at 8,500 rpm for 3 hrs. The thus-obtained reaction mixture was filtered by a mesh of 200 nm. Subsequent to rinsing with water, the thus-obtained magenta pigment was dispersed in water. Coarse particles were removed by centrifugal and ion-exchanged water was added in such a manner that the solid portion concentration was 20.0% to obtain a magenta pigment dispersion 17 having a surface treated with sulphanilic acid.

Thereafter, 37.50 parts of the pigment dispersion 17 were added to the aqueous solution 2 followed by stirring for 30 min. Furthermore, 6.67 parts of the copolymer 13 (solid content concentration: 30%) were added to the solution followed by stirring for 30 min. Thereafter, an aqueous ink 17 of the present invention was obtained by filtering the resultant with a membrane filter having a hole diameter of 1.2 μm.

Example 38

Preparation of Aqueous Ink 18

The aqueous solution 2 was prepared in the same manner as in Example 36, and 22.50 parts of the cyan pigment dispersion 3 prepared in Example 23 (a solid content: 20.0%) were added to the aqueous solution followed by stirring for 30 min. Furthermore, 6.67 parts of the copolymer 13 (solid content concentration: 30%) were added to the mixture followed by stirring for 30 min. Thereafter, an aqueous ink 18 of the present invention was obtained by filtering the resultant with a membrane filter having a hole diameter of 1.2 μm.

Comparative Example 21

Preparation of Comparative Aqueous Ink 1

The procedure for preparation of the pigment dispersion 1 in Example 21 was repeated except for replacing the copolymer 1 with the comparative copolymer 1 to prepare a comparative pigment dispersion 1.

Next, the procedure for preparation of the aqueous ink 1 in Example 21 was repeated except for replacing the pigment dispersion 1 with the comparative pigment dispersion 1 to prepare a comparative aqueous ink 1.

Comparative Example 22

Preparation of Comparative Aqueous Ink 2

The procedure for preparation of the pigment dispersion 3 in Example 23 was repeated except for replacing the copolymer 1 with the comparative copolymer 1 to prepare a comparative pigment dispersion 2.

Next, the procedure for preparation of the aqueous ink 3 in Example 23 was repeated except for replacing the pigment dispersion 3 with the comparative pigment dispersion 2 to prepare a comparative aqueous ink 2.

Comparative Example 23

Preparation of Comparative Aqueous Ink 3

The procedure for preparation of the pigment dispersion 4 in Example 24 was repeated except for replacing the copolymer 1 with the comparative copolymer 1 to prepare a comparative pigment dispersion 3.

Next, the procedure for preparation of the aqueous ink 4 in Example 24 was repeated except for replacing the pigment dispersion 4 with the comparative pigment dispersion 3 to prepare a comparative aqueous ink 3.

Comparative Example 24

Preparation of Comparative Aqueous Ink 4

The procedure for preparation of the pigment dispersion 5 in Example 25 was repeated except for replacing the copolymer 1 with the comparative copolymer 1 to prepare a comparative pigment dispersion 4.

Next, the procedure for preparation of the aqueous ink 5 in Example 25 was repeated except for replacing the pigment dispersion 5 with the comparative pigment dispersion 4 to prepare a comparative aqueous ink 4.

Comparative Example 25

Preparation of Comparative Aqueous Ink 5

The aqueous solution 2 was prepared in the same manner as in Example 36, and 22.50 parts of the cyan pigment dispersion 15 prepared in Example 36 (a solid content: 20.0%) were added to the aqueous solution followed by stirring for 30 min. Furthermore, 6.67 parts of the comparative copolymer 2 (solid content concentration: 30%) were added to the mixture followed by stirring for 30 min. Thereafter, a comparative aqueous ink 5 was obtained by filtering the resultant with a membrane filter having a hole diameter of 1.2 μm.

Comparative Example 26

Preparation of Comparative Aqueous Ink 6

The aqueous solution 1 was prepared in the same manner as in Example 37, and 37.50 parts of the magenta pigment dispersion 17 prepared in Example 37 (a solid content: 20.0%) were added to the aqueous solution followed by stirring for 30 min. Furthermore, 6.67 parts of the comparative copolymer 2 (solid content concentration: 30%) were added to the mixture followed by stirring for 30 min. Thereafter, a comparative aqueous ink 6 was obtained by filtering the resultant with a membrane filter having a hole diameter of 1.2 μm.

Comparative Example 27

Preparation of Comparative Aqueous Ink 7

The procedure for preparation of the aqueous ink 18 in Example 38 was repeated except for replacing the cyan pigment dispersion 3 with the comparative pigment dispersion 2 including the comparative copolymer 1, and the copolymer 13 with the comparative copolymer 2 as a copolymer added to the mixture to prepare a comparative aqueous ink 7.

Properties of each of the aqueous inks prepared in Examples and Comparative Examples were evaluated by the following methods. The results are shown in Table 2.

<Image Density>

An inkjet printer (IPSiO GX5000, manufactured by Ricoh Company Lt.) was filled with each ink at 23 degrees C. and 50 percent RH. A list including general symbols of 64 point JIS X 0208 (1997) and 2223 made by Microsoft Word 2000 (manufactured by Microsoft Corporation) was printed on plain paper 1 (Xerox 4200, manufactured by Xerox Corporation) and paper 2 (My Paper, manufactured by Ricoh Company Ltd.). The symbol portion on image surface was measured by X-Rite 938 (manufactured by X-Rite Inc.) and evaluated according to the following criteria.

The printing mode used was: A modified mode in which "Plain Paper—Standard Fast" was modified to "No Color Calibration" from the user setting for plain paper by the driver installed onto the printer.

Incidentally, the symbols of JIS X 0208 (1997) and 2223 have squares for the exterior and the inside thereof was entirely painted with ink.

[Evaluation Criteria]
A: 1.25 or higher
B: 1.20 to less than 1.25
C: 1.10 to less than 1.20
D: Less than 1.10
E: pigment was gelated and not dispersed, impossible to print symbols.

<Storage Stability of Ink>

An ink cartridge was filled with each ink and stored at 70° C. for one week. The change rate of the viscosity after the storage to the viscosity before the storage was obtained from the following relation and evaluated according to the following criteria.

The change rate of viscosity (%)=(Viscosity of ink after storage)/viscosity of ink before storage)×100

The viscosity was measured by a viscometer (RE80L, manufactured by TOKI SANGYO CO., LTD.) to measure the viscosity of the ink at 25° C. at 50 rotations.

[Evaluation Criteria]
A: Change rate of viscosity within + or −5%
B: change rate of viscosity within the range of from −8% to less than −5% and more than 5% to 8%
C: change rate of viscosity within −10% to less than −8% and greater than 8% to 10%.
D: change rate of viscosity within the range of from less than −10% to −30% and more than 10% to 30%
E: change rate of viscosity less than 30% or greater than 30% (gelated to the degree that evaluation was not possible)

<Beading>

The general symbols of JIS X 0208 (1997) and 2223 of were printed in the same manner as for Image Density except that the print mode was changed to the mode "gloss paper—fast" using LumiArt Gloss 90 GSM™ (manufactured by Stora Enso Japan K.K.) as the recording medium and the printed symbols were evaluated according to the following criteria.

Evaluation Criteria
A: No beading or beading occurred to less than 10% of the entire image
B: Beading occurred to 10% to less than 20% of the entire image
C: Beading occurred to 20% to less than 40% of the entire image
D: Beading occurred to 40% to less than 90% of the entire image
E: Beading occurred to 90% or more of the entire image
F: Gelated pigment not dispersed in ink, impossible to print symbols

TABLE 2(1)

| | Copolymer | | Coloring |
|---|---|---|---|
| | Number | Usage | Material |
| Example 21 | Copolymer 1 | Pigment Dispersion | Carbon Black |
| Example 22 | Copolymer 2 | Pigment Dispersion | Carbon Black |
| Example 23 | Copolymer 1 | Pigment Dispersion | Cyan Pigment |
| Example 24 | Copolymer 1 | Pigment Dispersion | Magenta Pigment |
| Example 25 | Copolymer 1 | Pigment Dispersion | Yellow Pigment |
| Example 26 | Copolymer 3 | Pigment Dispersion | Carbon Black |
| Example 27 | Copolymer 4 | Pigment Dispersion | Carbon Black |
| Example 28 | Copolymer 5 | Pigment Dispersion | Carbon Black |
| Example 29 | Copolymer 6 | Pigment Dispersion | Carbon Black |
| Example 30 | Copolymer 7 | Pigment Dispersion | Carbon Black |
| Example 31 | Copolymer 8 | Pigment Dispersion | Carbon Black |
| Example 32 | Copolymer 9 | Pigment Dispersion | Carbon Black |
| Example 33 | Copolymer 10 | Pigment Dispersion | Carbon Black |
| Example 34 | Copolymer 11 | Pigment Dispersion | Carbon Black |
| Example 35 | Copolymer 12 | Addition | Carbon Black |
| Example 36 | Copolymer 13 | Addition | Cyan Pigment |
| Example 37 | Copolymer 13 | Addition | Magenta Pigment |
| Example 38 | Copolymers 1 & 13 | Pigment Dispersion & Addition | Cyan Pigment |
| Comparative Example 21 | Comparative Copolymer 1 | Pigment Dispersion | Carbon Black |
| Comparative Example 22 | Comparative Copolymer 1 | Pigment Dispersion | Cyan Pigment |
| Comparative Example 23 | Comparative Copolymer 1 | Pigment Dispersion | Magenta Pigment |
| Comparative Example 24 | Comparative Copolymer 1 | Pigment Dispersion | Yellow Pigment |
| Comparative Example 25 | Comparative Copolymer 2 | Addition | Cyan Pigment |
| Comparative Example 26 | Comparative Copolymer 2 | Addition | Magenta Pigment |

TABLE 2(1)-continued

| | Copolymer | | Coloring |
|---|---|---|---|
| | Number | Usage | Material |
| Comparative Example 27 | Comparative Copolymers 1 & 2 | Pigment Dispersion & Addition | Cyan Pigment |

Having now fully described the invention, it will be apparent to one of ordinary skill in the art that many changes and modifications can be made thereto without departing from the spirit and scope of the invention as set forth therein.

What is claimed:

1. A copolymer, comprising structural units having the following formulae (1) and (2):

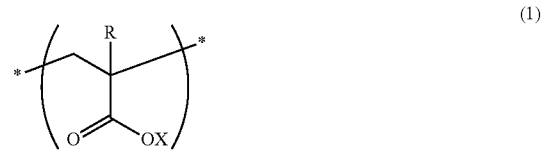

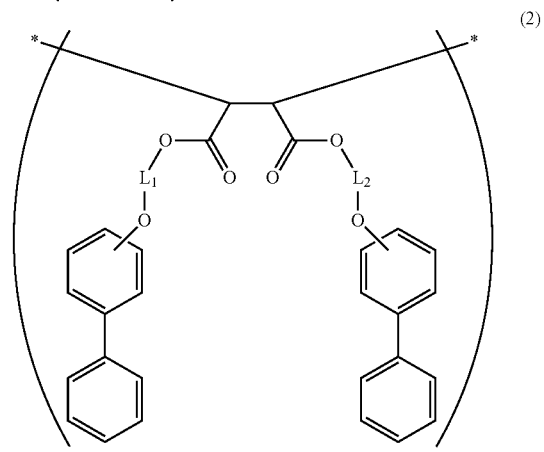

wherein R represents a hydrogen atom or a methyl group; X represents a hydrogen atom or a cationic ion; and each of L1 and L2 independently represents an alkylene group having 2 to 18 carbon atoms.

2. The copolymer of claim 1, wherein a molar ratio of the structural unit having the formula (1) to the structural unit having the formula (2) is from 1/1 to 5/1.

3. The copolymer of claim 1, wherein each of L1 and L2 of the structural unit having the formula (2) independently represents an alkylene group having 2 to 12 carbon atoms.

4. An aqueous ink, comprising:
water;
a coloring material; and
the copolymer according to claim 1.

5. The aqueous ink of claim 4, wherein the coloring material is a pigment.

6. The aqueous ink of claim 4, further comprising at least one of a hydrosoluble organic solvent and a surfactant.

7. An ink cartridge, comprising:
a container; and
the aqueous ink according to claim 4.

* * * * *